(12) United States Patent
Kobayashi

(10) Patent No.: US 11,726,680 B2
(45) Date of Patent: Aug. 15, 2023

(54) STORAGE CONTROL DEVICE, STORAGE DEVICE, AND NON-TRANSITORY COMPUTER-READABLE STORAGE MEDIUM FOR STORING STORAGE CONTROL PROGRAM

(71) Applicant: FUJITSU LIMITED, Kawasaki (JP)

(72) Inventor: Hidefumi Kobayashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/221,062

(22) Filed: Apr. 2, 2021

(65) Prior Publication Data
US 2022/0027068 A1    Jan. 27, 2022

(30) Foreign Application Priority Data

Jul. 21, 2020    (JP) .................................. 2020-124784

(51) Int. Cl.
*G06F 3/00*    (2006.01)
*G06F 3/06*    (2006.01)
(52) U.S. Cl.
CPC .......... *G06F 3/0629* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| 5,928,367 | A | 7/1999 | Nelson et al. | |
|---|---|---|---|---|
| 2009/0190156 | A1* | 7/2009 | Iwadate | ................. G06F 3/1214 358/1.14 |
| 2011/0022568 | A1* | 1/2011 | Kim | ...................... G06F 16/113 707/640 |
| 2014/0140135 | A1 | 5/2014 | Okano et al. | |

FOREIGN PATENT DOCUMENTS

JP    08-241173 A    9/1996
JP    2014-106567 A    6/2014

* cited by examiner

*Primary Examiner* — Midys Rojas
(74) *Attorney, Agent, or Firm* — ArentFox Schiff LLP

(57) ABSTRACT

A storage control device of controlling a storage device includes memory; and processor circuitry coupled to the memory, the processor circuitry being configured to perform processing, the processing including: determining a mode that indicates how to back up configuration information of the storage device on a basis of a redundant configuration state with another storage control device; and backing up the configuration information from a memory to a backup device on a basis of the determined mode.

14 Claims, 23 Drawing Sheets

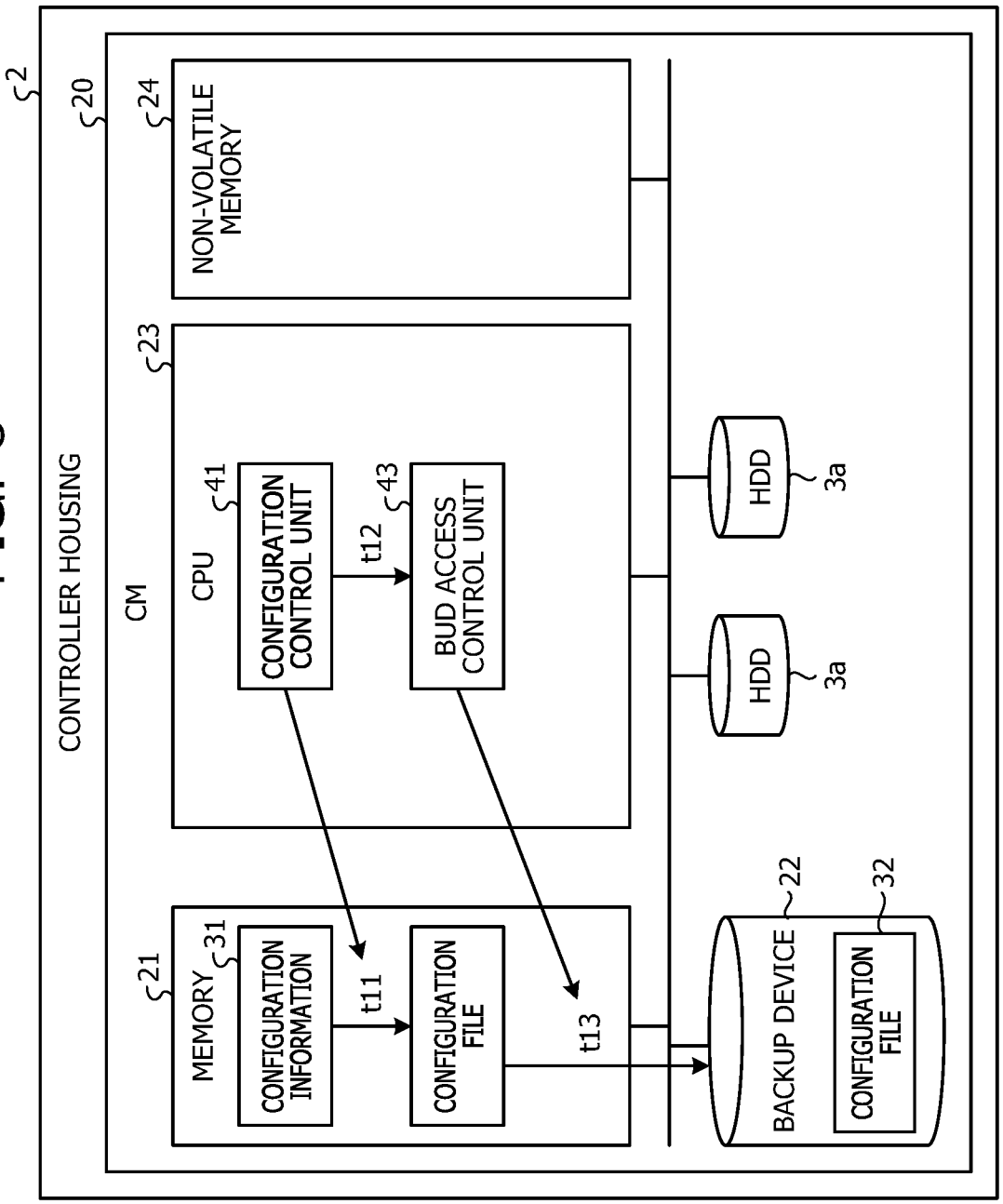

FIG. 7

| CM REDUNDANCY STATE | | WRITE MODE | OPERATION OVERVIEW |
|---|---|---|---|
| CM — CM | WITH REDUNDANCY | PERIODIC WRITE MODE | WRITE CONFIGURATION INFORMATION IN MEMORY TO BACKUP DEVICE ONCE A DAY (WRITING TO BACKUP DEVICE IS PERFORMED ONLY ONCE A DAY EVEN WHEN CONFIGURATION CHANGE OCCURS AT INTERVAL OF SEVERAL MINUTES) |
| CM — CM✗ | NO REDUNDANCY (SHORT PERIOD OF TIME) | EACH-TIME WRITE MODE | WRITE CONFIGURATION INFORMATION IN MEMORY TO BACKUP DEVICE EACH TIME CONFIGURATION IS CHANGED |
| CM — CM✗ / BACKUP DEVICE | NO REDUNDANCY (LEFT TO STAND FOR LONG TIME) | NVRAM COMBINED MODE | WRITE CONFIGURATION CHANGE DATA TO NVRAM, NOT TO BACKUP DEVICE, EACH TIME CONFIGURATION IS CHANGED (THIS IS BECAUSE DATA AMOUNT IS MINIMIZED WITH CONFIGURATION CHANGE DATA) |

FIG. 10

| BEFORE CHANGE | AFTER CHANGE | | |
|---|---|---|---|
| | PERIODIC WRITING | EACH-TIME WRITING | NVRAM COMBINATION |
| PERIODIC WRITING | - (NO ACTION) | - CHANGE WRITE MODE TO EACH-TIME WRITING | - CHANGE WRITE MODE TO NVRAM COMBINATION |
| EACH-TIME WRITING | - CHANGE WRITE MODE TO PERIODIC WRITING | - (NO ACTION) | - CHANGE WRITE MODE TO NVRAM COMBINATION |
| NVRAM COMBINATION | - WRITE CONFIGURATION INFORMATION IN MEMORY TO BACKUP DEVICE<br>- CHANGE WRITE MODE TO PERIODIC WRITING<br>- INITIALIZE NON-VOLATILE MEMORY | - WRITE CONFIGURATION INFORMATION IN MEMORY TO BACKUP DEVICE<br>- CHANGE WRITE MODE TO EACH-TIME WRITING<br>- INITIALIZE NON-VOLATILE MEMORY | - (NO ACTION) |

FIG. 16C

[Step-3]
ONE COMMAND (0x0100: VOLUME CREATION) IS LINED UP IN CONFIGURATION
CHANGE COMMAND QUEUE
VOLUME NUMBER = 0x1234 AND VOLUME SIZE = 0x20000 GB ARE SPECIFIED BY
PARAMETER

| | CONFIGURATION CHANGE COMMAND QUEUE | | NUMBER OF QUEUES: 2 |
|---|---|---|---|
| #0 | 0x0001 | 0x77000000 0x00000000~ | DEVICE MODE SETTING |
| #1 | 0x0100 | 0x12342000 0x00000000~ | VOLUME CREATION |
| #2 | 0xFFFF | ALL0 | |
| ⋮ | | | |
| #255 | 0xFFFF | ALL0 | |

FIG. 16E

[Step-5]
ONE COMMAND (0x0101: VOLUME MODE SETTING) IS FURTHER LINED UP IN CONFIGURATION CHANGE COMMAND QUEUE
SETTING VALUE = 0x01 (ENCRYPTION MODE) IS SPECIFIED BY PARAMETER
THIS VOLUME MODE SETTING 0x01 INDICATES ENCRYPTION VOLUME, AND ENCRYPTION VOLUME IS CREATED WHEN CREATING VOLUME THEREAFTER

| | CONFIGURATION CHANGE COMMAND QUEUE | NUMBER OF QUEUES: 3 | |
|---|---|---|---|
| #0 | 0x0100 | 0x12342000 0x00000000 ~ | VOLUME CREATION |
| #1 | 0x0001 | 0x88000000 0x00000000 ~ | DEVICE MODE SETTING |
| #2 | 0x0101 | 0x01000000 0x00000000 ~ | VOLUME MODE SETTING (ENCRYPTION MODE) |
| ... | | | |
| #255 | 0xFFFF | ALL0 | |

FIG. 16F

[Step-6]
ONE COMMAND (0x0100: VOLUME CREATION) IS FURTHER LINED UP IN CONFIGURATION CHANGE COMMAND QUEUE
VOLUME NUMBER = 0x5678 AND VOLUME SIZE = 0x2000 GB ARE SPECIFIED BY PARAMETER
SINCE VOLUME MODE IS 0x01, ENCRYPTION VOLUME IS INDICATED, AND ENCRYPTION VOLUME IS CREATED WHEN CREATING VOLUME THEREAFTER

| | CONFIGURATION CHANGE COMMAND QUEUE | NUMBER OF QUEUES: 4 | |
|---|---|---|---|
| #0 | 0x0100 | 0x12342000 0x00000000 ~ | VOLUME CREATION |
| #1 | 0x0001 | 0x88000000 0x00000000 ~ | DEVICE MODE SETTING |
| #2 | 0x0101 | 0x01000000 0x00000000 ~ | VOLUME MODE SETTING (ENCRYPTION MODE) |
| #3 | 0x0100 | 0x56782000 0x00000000 ~ | VOLUME CREATION (ENCRYPTION VOLUME) |
| ... | | | |
| #255 | 0xFFFF | ALL0 | |

FIG. 16G

[Step-7]
ONE COMMAND (0x0101: VOLUME MODE SETTING) IS FURTHER LINED UP IN CONFIGURATION CHANGE COMMAND QUEUE
SETTING VALUE = 0x00 (NON-ENCRYPTION MODE) IS SPECIFIED BY PARAMETER WHILE VOLUME MODE SETTING COMMAND IS LINED UP AT #2, #2 MAY NOT BE REMOVED SIMILARLY TO [Step-4] AS #2 IS INTERRELATED WITH #3 (VOLUME CREATION)

| | CONFIGURATION CHANGE COMMAND QUEUE | NUMBER OF QUEUES: 5 | |
|---|---|---|---|
| #0 | 0x0100 | 0x12342000 0x00000000 ~ | VOLUME CREATION |
| #1 | 0x0001 | 0x88000000 0x00000000 ~ | DEVICE MODE SETTING |
| #2 | 0x0101 | 0x01000000 0x00000000 ~ | VOLUME MODE SETTING (ENCRYPTION MODE) |
| #3 | 0x0100 | 0x56782000 0x00000000 ~ | VOLUME CREATION (ENCRYPTION VOLUME) |
| #4 | 0x0101 | 0x00000000 0x00000000 ~ | VOLUME MODE SETTING (NON-ENCRYPTION MODE) |
| ... | | | |
| #255 | 0xFFFF | ALL0 | |

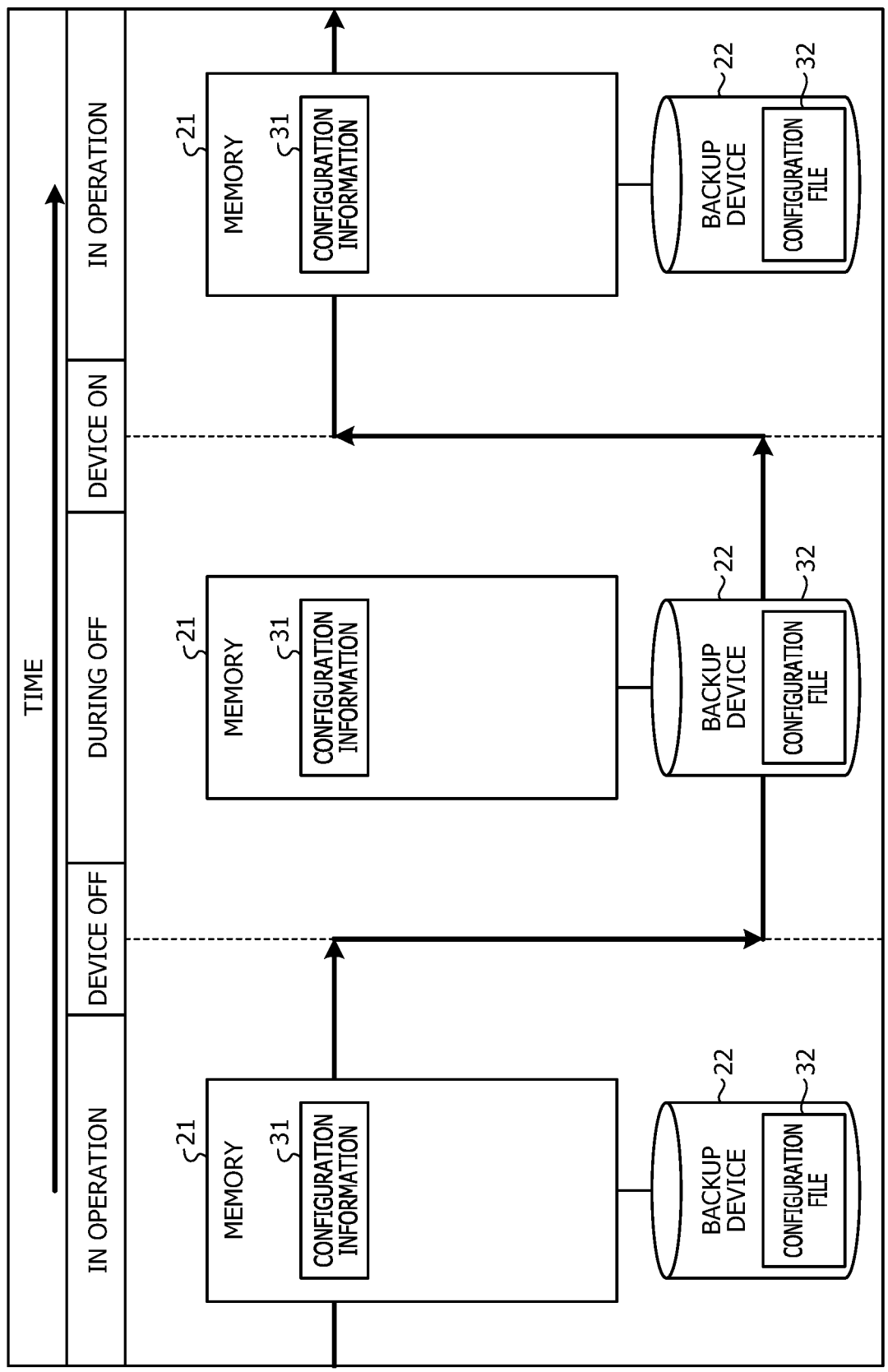

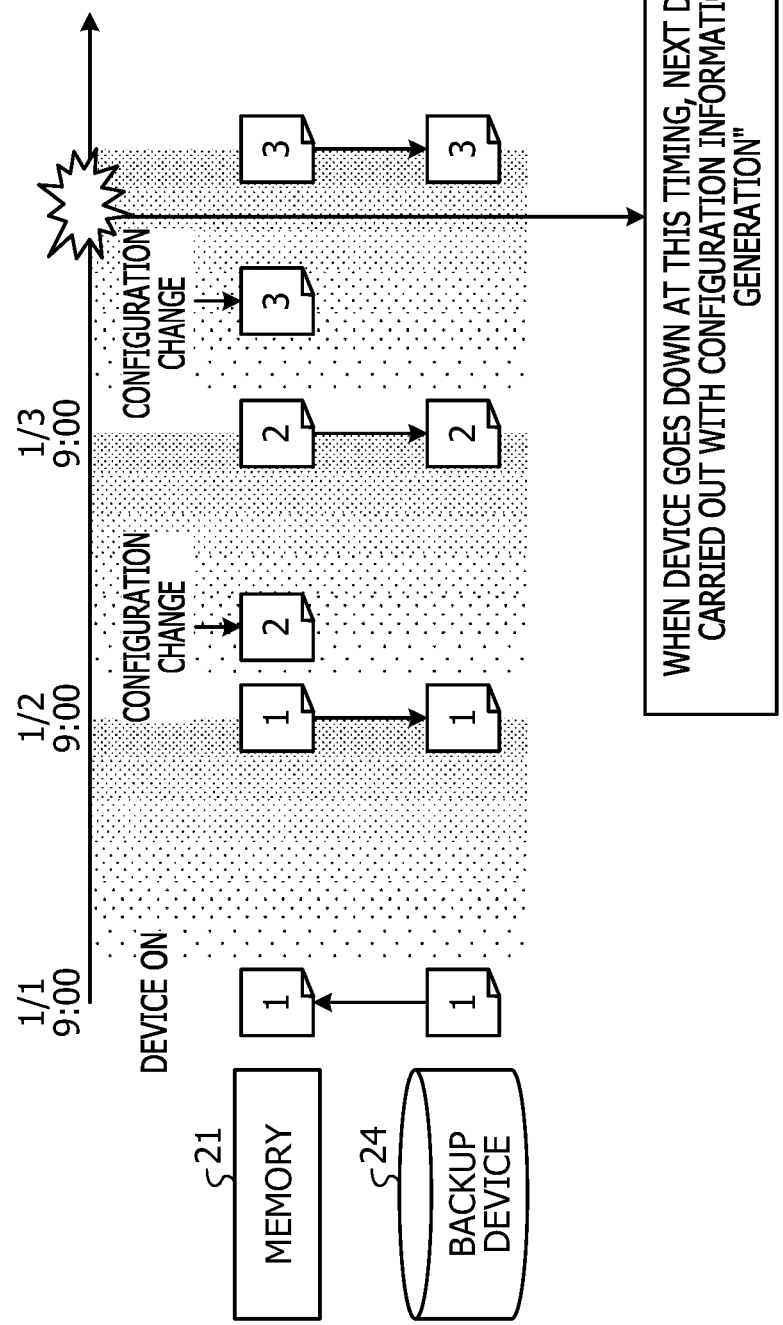

STORAGE CONTROL DEVICE, STORAGE DEVICE, AND NON-TRANSITORY COMPUTER-READABLE STORAGE MEDIUM FOR STORING STORAGE CONTROL PROGRAM

CROSS-REFERENCE TO RELATED APPLICATION

This application is based upon and claims the benefit of priority of the prior Japanese Patent Application No. 2020-124784, filed on Jul. 21, 2020, the entire contents of which are incorporated herein by reference.

FIELD

The embodiment discussed herein is related to a storage control device, a storage device, and a non-transitory computer-readable storage medium storing a storage control program.

BACKGROUND

A storage device retains configuration information, such as device setting information and user volume information, in the device. The size of the configuration information is, for example, several tens of megabytes (MB). The storage device retains the configuration information in a memory during operation, and retains it in a backup device when the device is turned off.

FIG. 17 is a diagram illustrating how the configuration information is retained. As illustrated in FIG. 17, when the device is turned off, the storage device stores, in a backup device 22, configuration information 31 retained in a memory 21 during operation as a configuration file 32. Then, when the device is turned on, the storage device reads the configuration file 32 from the backup device 22, and loads the configuration information 31 in the memory 21.

Furthermore, the storage device backs up the configuration information 31 in the backup device 22 even during operation to cope with an unexpected situation such as when the device fails to be normally turned off. However, since a solid state drive (SSD) used by the backup device 22 to store the configuration information 31 has data retention characteristics, whereby the life of the backup device 22 becomes shorter as the frequency of the backup increases. Here, the data retention characteristics indicate characteristics in which a data retention period becomes shorter as the amount of writing increases. Accordingly, the frequency of the backup during operation is limited to once a day, for example.

Note that there is a technique of accelerating recovery of a storage device as a prior art related to a storage device. According to the technique, a storage device determines whether or not backup data stored in a non-volatile memory is valid upon detection of failure occurrence in a control device that controls access to the storage. Then, in a case where the backup data in the non-volatile memory is determined to be valid, the storage device restarts without backing up the data in the non-volatile memory, and then restores the backup data in the non-volatile memory to a volatile memory.

Furthermore, as a prior art related to a storage device, there is a disk storage system that immediately and accurately recovers a failure in a case where a control device or its memory fails. This disk storage system includes dual control devices, each having a mirrored memory synchronized in real time, which may be immediately replaced with another control device when one control device or its memory fails. The mirrored memory includes a non-volatile random access memory, and retains data. The dual control devices use the mirrored memory synchronized in real time, whereby, when one control device fails, a recovery speed and accuracy improve in the case of replacing the control device with the other control device for failure recovery.

Examples of the related art include Japanese Laid-open Patent Publication No. 2014-106567 and Japanese Laid-open Patent Publication No. 08-241173.

In recent years, a frequency of configuration changes (volume creation/deletion, etc.) during operation has increased such as configuration changes associated with quality of service (QoS) operation, storage layering, and virtual machine (VM) linkage. Therefore, the way of holding the configuration information 31 illustrated in FIG. 17 has a problem that the old configuration information 31 is used in a case where the storage device restarts at the time of recovery from a failure. FIG. 18 is a diagram for explaining the configuration information 31 when restarting at the time of recovery from a failure. In FIG. 18, "1" represents the configuration information 31 of a "first generation", "2" represents the configuration information 31 of a "second generation", and "3" represents the configuration information 31 of a "third generation". Furthermore, backing up of the configuration information 31 in operation is performed once a day.

As illustrated in FIG. 18, when the device is turned on at 9:00 on January 1 (1/1), the storage device reads the configuration information 31 of the "first generation" from the backup device 22, and loads it in the memory 21. Then, the storage device backs up the configuration information 31 of the "first generation" to the backup device 22 at 9:00 on January 2. Thereafter, a configuration change is performed, and the configuration information 31 is changed to the "second generation". Then, the storage device backs up the configuration information 31 of the "second generation" to the backup device 22 at 9:00 on January 3.

Thereafter, a configuration change is performed, and the configuration information 31 is changed to the "third generation". Then, in a case where the device goes down before the configuration information 31 of the "third generation" is backed up to the backup device 22, the storage device reads the configuration information 31 of the "second generation" from the backup device 22 at the time of a restart and loads it in the memory 21. For example, the storage device starts operation on the basis of the configuration information 31 of the old "second generation" instead of the configuration information 31 of the latest "third generation".

In an aspect of this disclosure described below, there provided is a solution to operate a storage device after a restart on the basis of the latest configuration information while suppressing a frequency of backing up of configuration information.

SUMMARY

According to an aspect of the embodiments, a storage control device of controlling a storage device includes memory; and processor circuitry coupled to the memory, the processor circuitry being configured to perform processing, the processing including: determining a mode that indicates how to back up configuration information of the storage device on a basis of a redundant configuration state with another storage control device; and backing up the configuration information from a memory to a backup device on a basis of the determined mode.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating a flow of writing configuration information to a backup device;

FIG. 7 is a diagram for explaining a write mode;

FIG. 10 is a diagram for explaining processing performed by a configuration control unit when the write mode is switched;

FIG. 16C is a diagram illustrating a state in which one command is added to the configuration change command queue;

FIG. 16E is a diagram illustrating a state in which one command is further added to the configuration change command queue;

FIG. 16F is a diagram illustrating a state in which one command is further added to the configuration change command queue;

FIG. 16G is a diagram illustrating a state in which one command is further added to the configuration change command queue;

FIG. 17 is a diagram illustrating how configuration information is retained; and FIG. 18 is a diagram for explaining configuration information when restarting at the time of recovery from a failure.

DESCRIPTION OF EMBODIMENTS

Hereinafter, an embodiment of a storage control device, a storage device, and a storage control program disclosed by the present application will be described in detail with reference to the accompanying drawings. Note that the present embodiment does not limit the technology disclosed.

Embodiment

Figure 1:
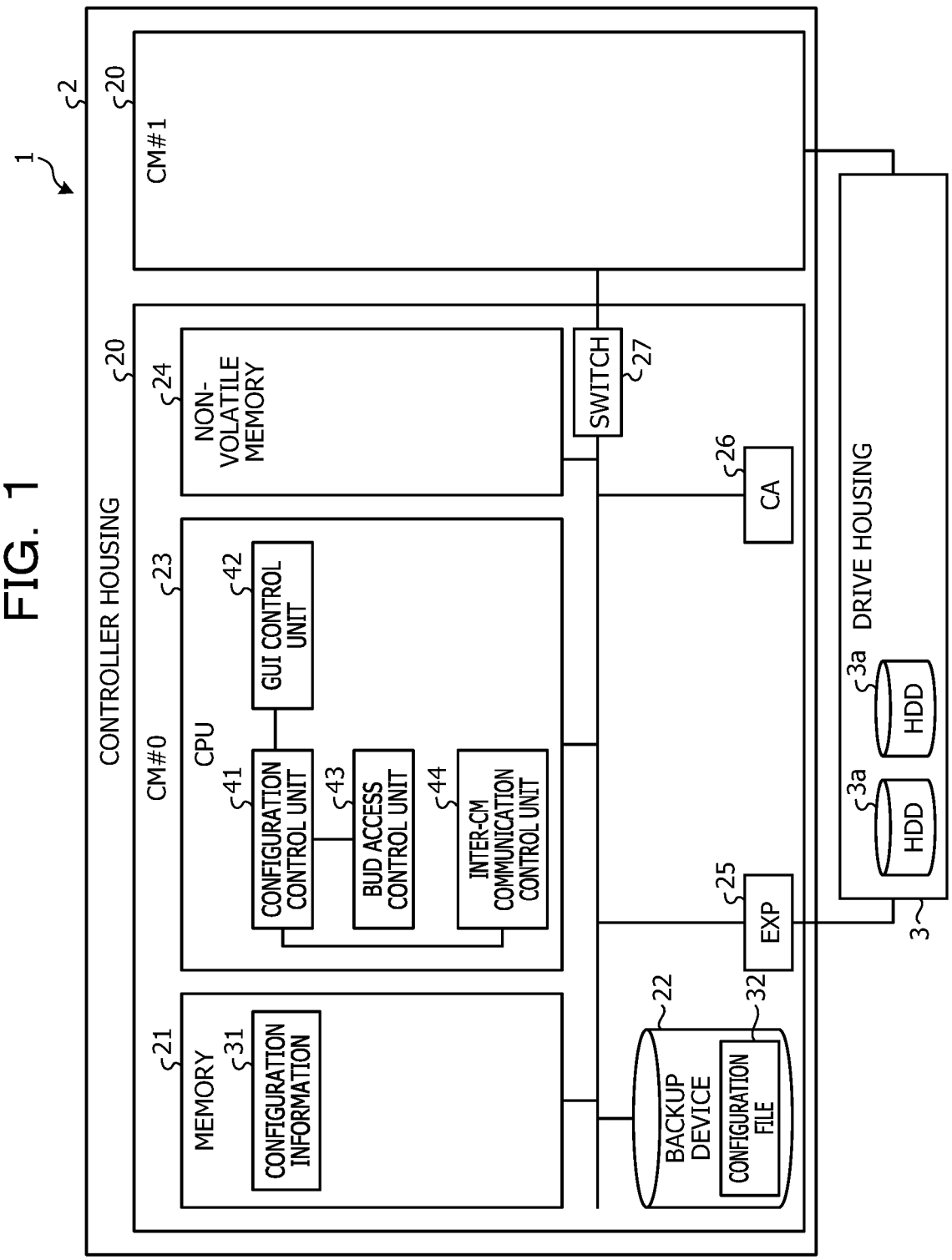
FIG. 1 is a diagram illustrating a configuration of a storage device according to an embodiment.

First, a configuration of a storage device according to an embodiment will be described. FIG. 1 is a diagram illustrating a configuration of the storage device according to the embodiment. As illustrated in FIG. 1, a storage device 1 according to the embodiment includes a controller housing 2 and a drive housing 3. The controller housing 2 includes two controller modules (CMs) 20 represented by a CM #0 and a CM #1. The CM 20 is a control device that controls the storage device 1. The CM #0 and the CM #1 form a redundant system.

The drive housing 3 includes a storage device that stores data, programs, and the like. The drive housing 3 includes a plurality of hard disk drives (HDDs) 3a as storage devices. The drive housing 3 may include SSDs in all or a part of the storage devices.

The CM 20 includes a memory 21, a backup device 22, a central processing unit (CPU) 23, a non-volatile memory 24, an expander (EXP) 25, a channel adapter (CA) 26, and a switch 27.

The memory 21 is a random access memory (RAM) that stores a storage control program to be executed by the CPU 23. Furthermore, the memory 21 stores data to be used by the storage control program. The memory 21 stores configuration information 31. The CM #0 and the CM #1 each store the configuration information 31.

The configuration information 31 includes information associated with components constituting the device and the like, and device setting information. The information associated with components constituting the device and the like includes device model information, the number of controllers, a type of the controllers, the number of channel adapters, a type of the channel adapters, volume information, and the like. The volume information includes a type of redundant arrays of inexpensive disks (RAID), volume capacity, and the like. The device setting information includes device mode setting information such as a high-reliability mode, host affinity setting information, copy function setting information, and the like.

Figure 2:
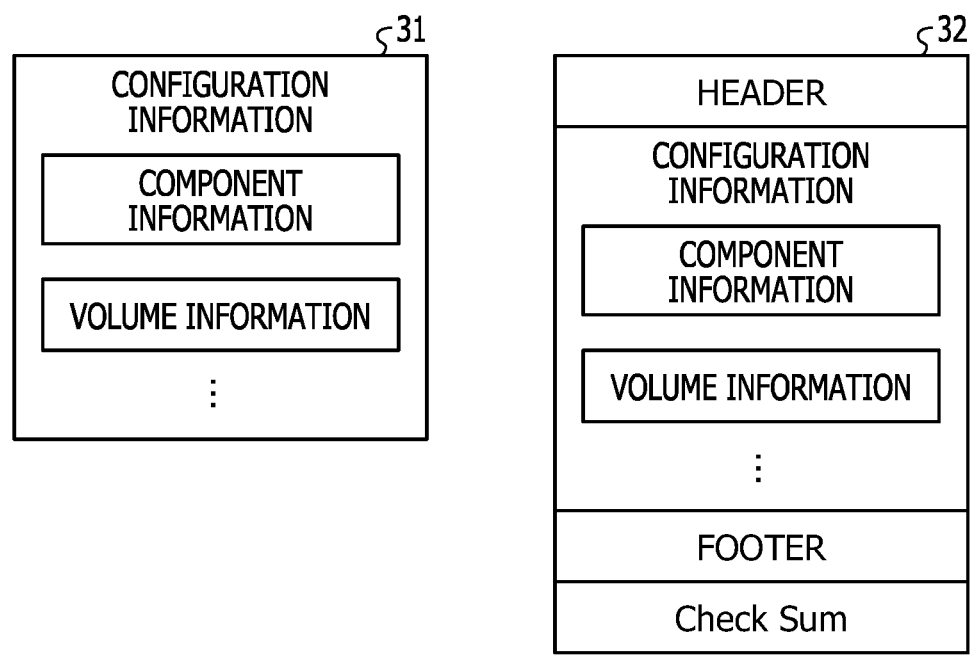
FIG. 2 is a diagram illustrating configuration information and a configuration file.

The backup device 22 stores a configuration file 32. The configuration file 32 is a file that stores the configuration information 31. FIG. 2 is a diagram illustrating the configuration information 31 and the configuration file 32. As illustrated in FIG. 2, the configuration file 32 includes, in addition to the configuration information 31, a header, a footer, and a check sum. The check sum is used to verify the validity of the configuration file 32. The configuration information 31 in the memory 21 may be partially updated. On the other hand, the configuration file 32 may not be partially updated. The configuration information 31 in the configuration file 32 is updated in a file unit.

The CPU 23 is a central processing unit that reads the storage control program from the memory 21 to execute the program. The CPU 23 executes the storage control program to cause the CM 20 to function as a storage control device including a configuration control unit 41, a graphical user interface (GUI) control unit 42, a BUD access control unit 43, and an inter-CM communication control unit 44.

The configuration control unit 41 manages the configuration information 31, and controls the update of the configuration information 31. The GUI control unit 42 receives a configuration change instruction from a management server, and passes it to the configuration control unit 41. Here, the management server is a device that manages the storage device 1.

Figure 3:
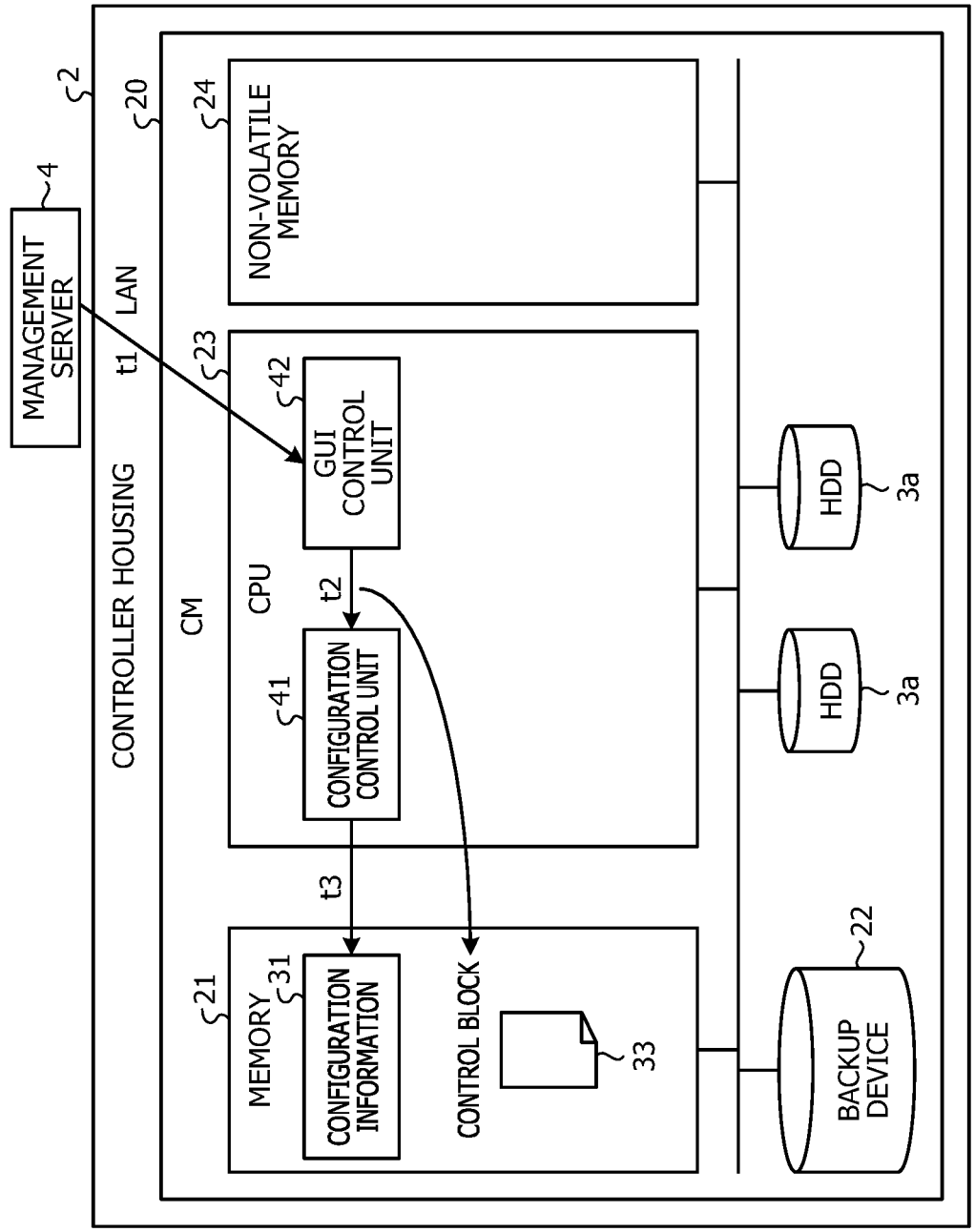
FIG. 3 is a diagram illustrating a flow of a configuration change.

FIG. 3 is a diagram illustrating a flow of a configuration change. As illustrated in FIG. 3, the GUI control unit 42 receives a configuration change instruction from a management server 4 via a local area network (LAN) (t1). Then, the GUI control unit 42 passes a configuration change request to the configuration control unit 41 using a control block 33 in the memory 21 (t2). Here, the control block 33 is a storage area to be used in the case of requesting processing between control units. Then, the configuration control unit 41 updates the configuration information 31 on the basis of information of the control block 33 (t3).

Figure 4:
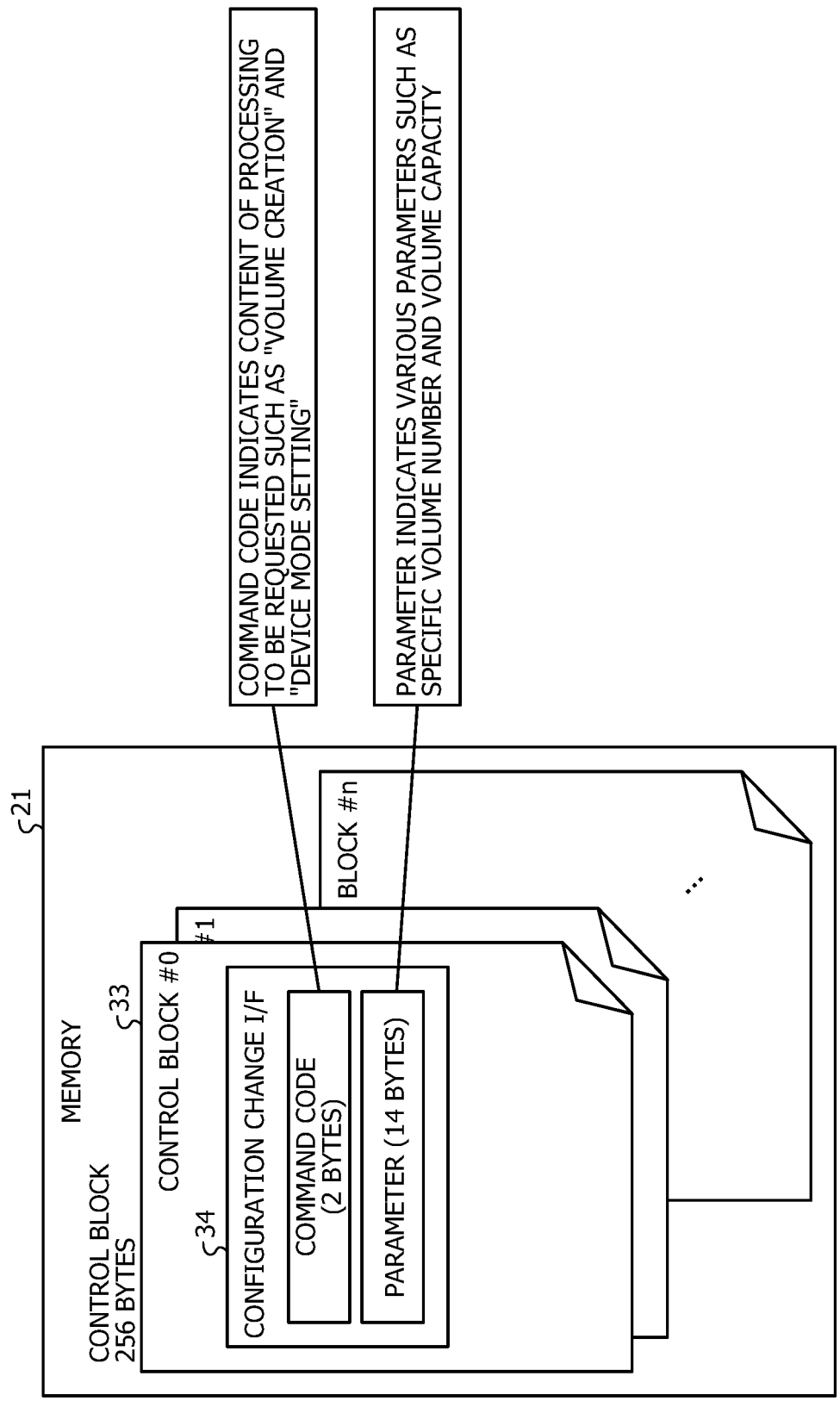
FIG. 4 is a diagram for explaining a control block.

FIG. 4 is a diagram for explaining the control block 33. As illustrated in FIG. 4, the memory 21 is provided with the control blocks 33 represented by control blocks #0 to #n. A size of each of the control blocks 33 is 256 bytes. The control block 33 includes a configuration change I/F 34. The configuration change I/F 34 is used in the case of requesting a configuration change.

The configuration change I/F 34 stores a 2-byte command code and a 14-byte parameter. The command code indicates the content of the processing to be requested, which includes, for example, "volume creation", "device mode setting", and the like. The parameter is a processing parameter, which includes, for example, a volume number, a volume capacity, and the like in a case where the command code is "volume creation".

Figure 5:
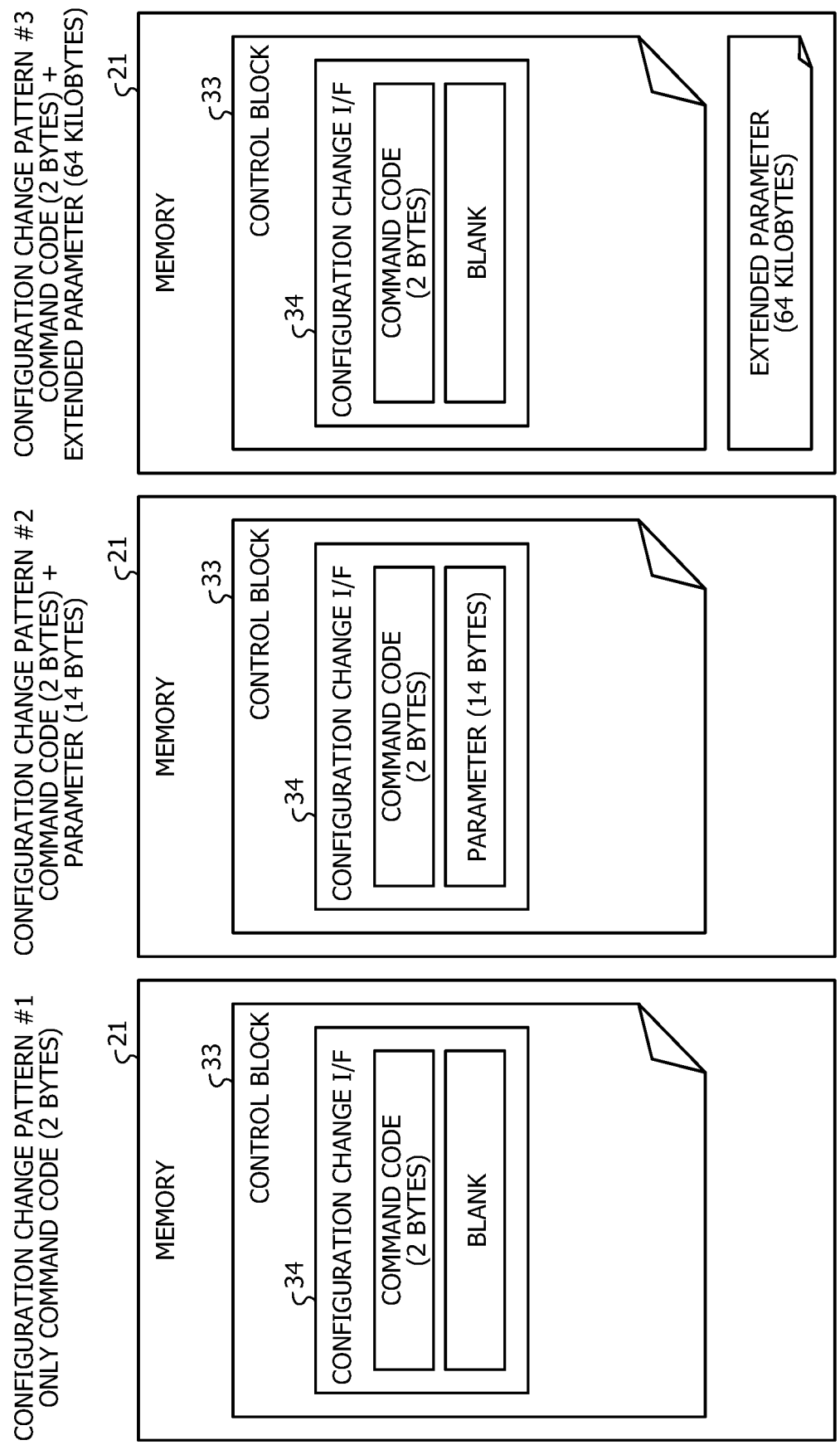
FIG. 5 is a diagram illustrating three patterns of a configuration change interface (I/F)

The configuration change I/F 34 has three patterns represented by configuration change patterns #1 to #3. FIG. 5 is a diagram illustrating the three patterns of the configuration change I/F 34. The configuration change pattern #1 includes only the command code. The configuration change pattern #2 includes the command code and the parameter. The configuration change pattern #3 includes the command code and a 64-byte extended parameter. The extended parameter is stored in the memory 21 other than the control block 33. The configuration change pattern #3 is used infrequently.

Returning to FIG. 1, the BUD access control unit 43 writes the configuration file 32 created by the configuration control unit 41 to the backup device 22 on the basis of an instruction from the configuration control unit 41. Furthermore, the BUD access control unit 43 reads the configuration file 32 from the backup device 22, and loads the configuration information 31 in the memory 21 on the basis of an instruction from the configuration control unit 41.

FIG. 6 is a diagram illustrating a flow of writing the configuration information 31 to the backup device 22. As illustrated in FIG. 6, the configuration control unit 41 creates a configuration file 32 to be written to the backup device 22 on the basis of the configuration information 31 in the memory 21 (t11). Then, the configuration control unit 41 instructs the BUD access control unit 43 to write the configuration file 32 (t12). Then, the BUD access control unit 43 writes the configuration file 32 to the backup device 22 (t13).

The configuration control unit 41 controls the writing of the configuration information 31 on the basis of a write mode. The configuration control unit 41 determines a write mode on the basis of a redundancy state of the CM 20. FIG. 7 is a diagram for explaining a write mode. As illustrated in FIG. 7, the write mode includes a periodic write mode, an each-time write mode, and a non-volatile RAM (NVRAM) combined mode.

The periodic write mode is a write mode when the CM 20 has redundancy. For example, the periodic write mode is a write mode at the time when both the CM #0 and the CM #1 are operating. In the periodic write mode, the configuration control unit 41 instructs the BUD access control unit 43 once a day to write the configuration information 31 in the memory 21 to the backup device 22. Even in a case where a configuration change occurs at intervals of several minutes, the configuration control unit 41 performs writing on the backup device 22 only once a day. When the CM 20 has redundancy, the configuration control unit 41 may obtain the latest configuration information 31 from another CM 20 at the time of a restart for recovery in a case where a failure occurs in the CM 20.

The each-time write mode is a write mode when the CM 20 has no redundancy and the non-redundant state continues for a time equal to or less than a threshold time. The threshold time is, for example, 24 hours. In the each-time write mode, the configuration control unit 41 instructs the BUD access control unit 43 to write the configuration information 31 in the memory 21 to the backup device 22 each time the configuration changes.

The NVRAM combined mode is a write mode when the CM 20 has no redundancy and the non-redundant state continues for a time longer than the threshold time. In the NVRAM combined mode, the configuration control unit 41 writes the configuration change data to the non-volatile memory 24 each time the configuration changes to suppress the amount of writing to the backup device 22. Here, the configuration change data is a command code and a parameter stored in the configuration change I/F 34.

The non-volatile memory 24 is an NVRAM. The non-volatile memory 24 stores, for example, 1,440 configuration change data. The configuration change data stored in the non-volatile memory 24 is used when the device goes down and the storage device 1 is restarted.

Figure 8:
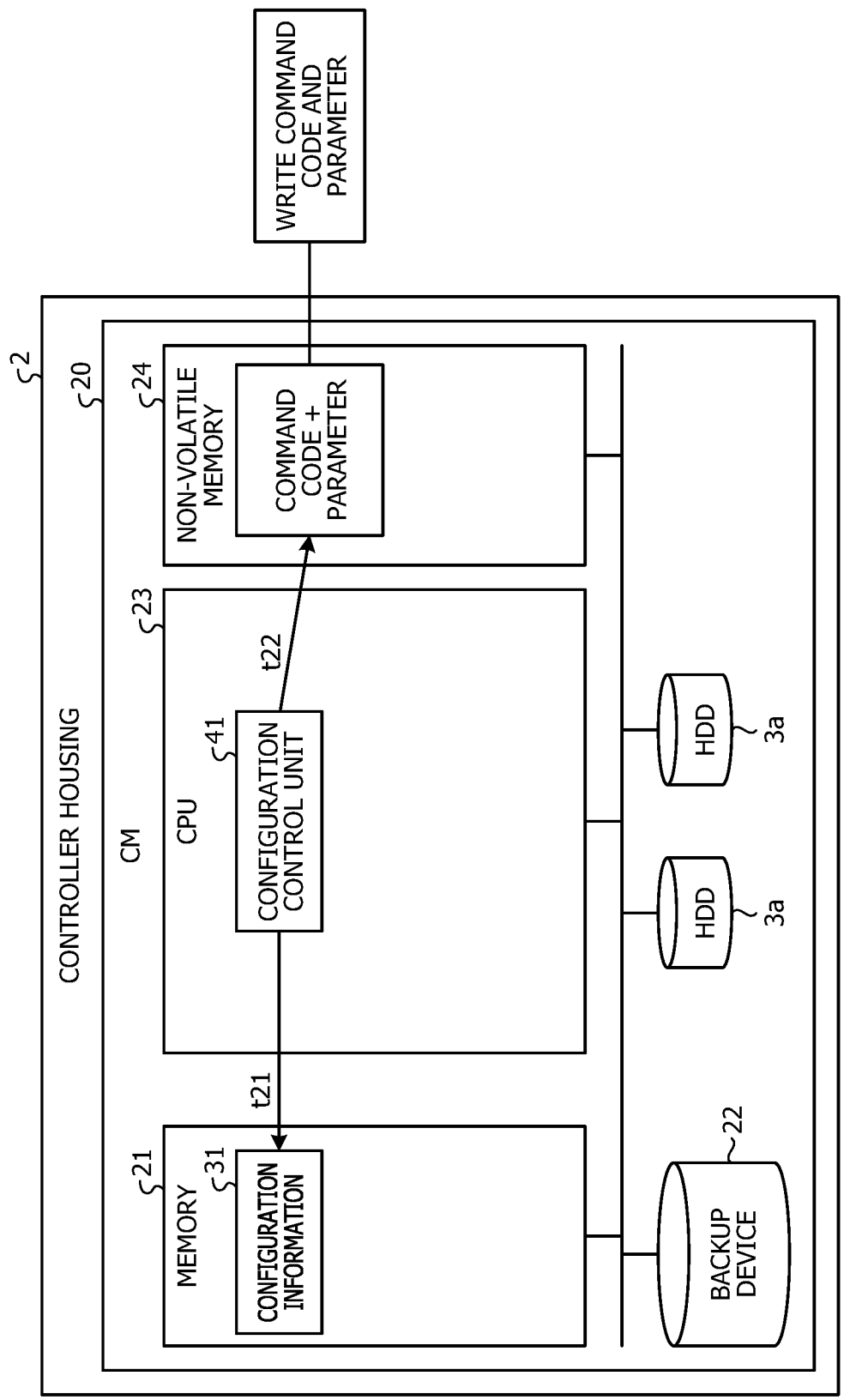
FIG. 8 is a diagram illustrating a configuration change process in an NVRAM combined mode.

FIG. 8 is a diagram illustrating a configuration change process in the NVRAM combined mode. As illustrated in FIG. 8, the configuration control unit 41 updates the configuration information 31 in the memory 21 (t21). Then, the configuration control unit 41 writes the command code and the parameter included in the configuration change I/F 34 to the non-volatile memory 24 (t22).

While the non-volatile memory 24 stores, among the configuration change patterns #1 to #3 illustrated in FIG. 5, the configuration change data of the configuration change pattern #1 and the configuration change pattern #2, it does not store the configuration change data of the configuration change pattern #3 as the extended parameter is large. Therefore, in a case where the configuration change of the configuration change pattern #3 occurs, the configuration control unit 41 instructs the BUD access control unit 43 to write the latest configuration information 31 to the backup device 22. Then, the configuration control unit 41 deletes the configuration change data previously stored in the non-volatile memory 24.

Figure 9:
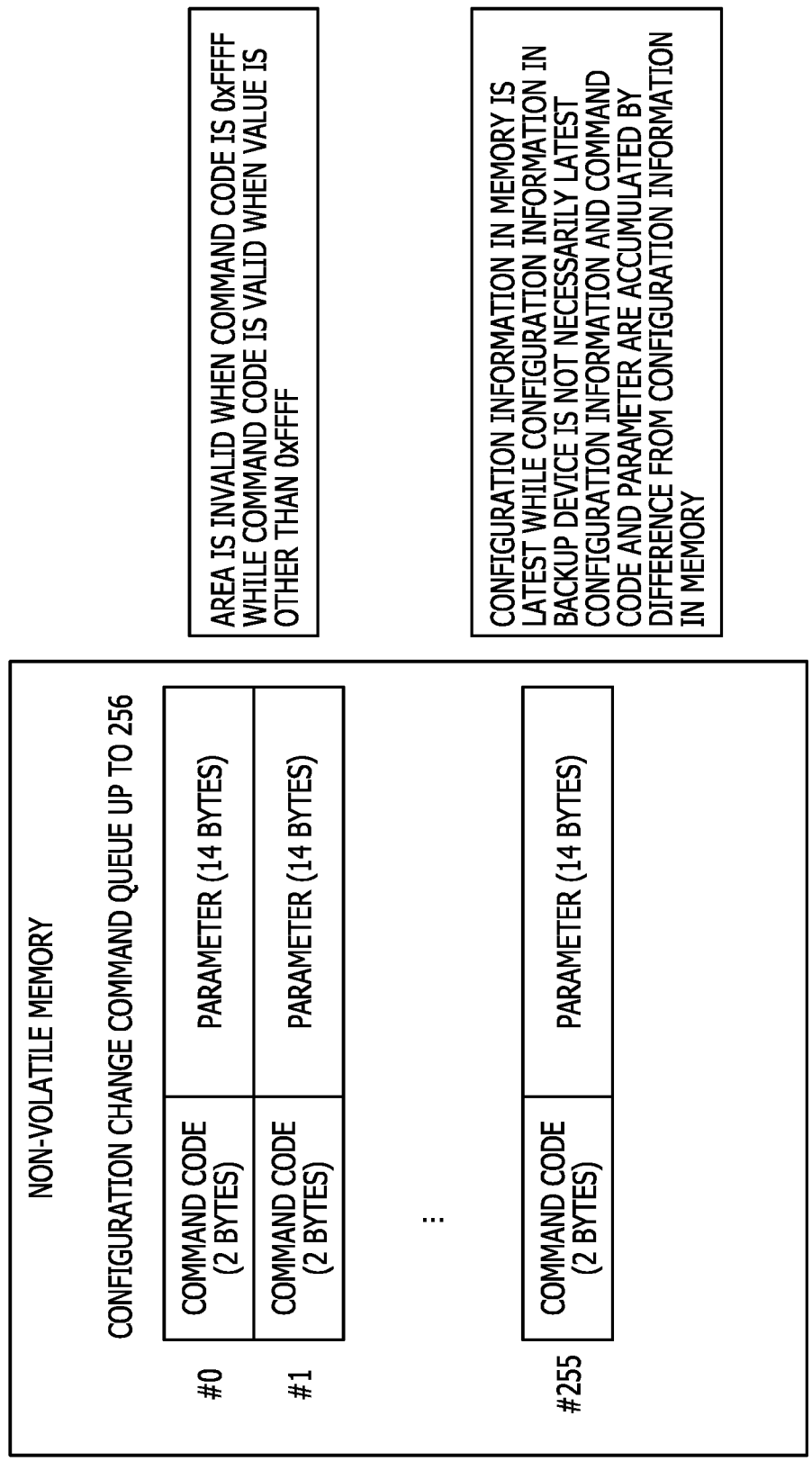
FIG. 9 is a diagram illustrating an exemplary configuration change command queue.

The configuration control unit 41 manages the configuration change data of the non-volatile memory 24 using a configuration change command queue. FIG. 9 is a diagram illustrating an exemplary configuration change command queue. In FIG. 9, the configuration change command queue stores up to 256 commands (configuration change data). In the configuration change command queue, the command code is invalid in a case where the command code is 0xFFFF in hexadecimal.

Although the configuration information 31 in the memory 21 is the latest, the configuration information 31 in the backup device 22 is not necessarily the latest. The configuration control unit 41 manages, using the configuration change command queue, a difference between the configuration information 31 in the memory 21 and the configuration information 31 in the backup device 22.

In a case where the number of commands stored in the configuration change command queue has reached the maximum number, the configuration control unit 41 instructs the BUD access control unit 43 to write the latest configuration information 31 to the backup device 22 in a similar manner to the case where the configuration change of the configuration change pattern #3 occurs. Then, the configuration control unit 41 deletes the commands previously stored in the configuration change command queue.

In a case where similar configuration changes occur multiple times in the management of the configuration change command queue, the configuration control unit 41 optimizes the configuration change command queue. Specifically, for example, in a case where an old command is invalidated by a command to be newly added, the configuration control unit 41 abandons the old command, and adds the new command to the configuration change command queue. For example, in a case where an old device mode setting command is in the configuration change command queue at the time of adding a new device mode setting command, the configuration control unit 41 abandons the old device mode setting command, and adds the new device mode setting command to the configuration change command queue.

At the time of switching the write mode from the NVRAM combined mode to the periodic write mode or to the each-time write mode, the configuration control unit 41 instructs the BUD access control unit 43 to write the latest configuration information 31 to the backup device 22. Then, the configuration control unit 41 deletes the configuration change data previously stored in the non-volatile memory 24.

FIG. 10 is a diagram for explaining processing performed by the configuration control unit 41 when the write mode is switched. As illustrated in FIG. 10, when the write mode is switched from the periodic write mode to the each-time write mode or to the NVRAM combined mode, the configuration control unit 41 changes the write mode. In a similar manner, when the write mode is switched from the each-time write mode to the periodic write mode or to the NVRAM combined mode, the configuration control unit 41 changes the write mode.

Meanwhile, when the write mode is switched from the NVRAM combined mode to the periodic write mode or to the each-time write mode, the configuration control unit 41 instructs the BUD access control unit 43 to write the configuration information 31 in the memory 21 to the backup device 22. Then, the configuration control unit 41 changes the write mode, and initializes the non-volatile memory 24.

At the time of a restart after the device is unexpectedly turned off, the configuration control unit 41 instructs the BUD access control unit 43 to extract the configuration information 31 from the backup device 22 and loads it in the memory 21, thereby starting up the storage device 1. At that time, if there is a valid command code in the non-volatile memory 24, the configuration control unit 41 determines that the configuration information 31 extracted from the backup device 22 is not the latest, and updates the configuration information 31 on the basis of the configuration change data stored in the non-volatile memory 24.

In this manner, the configuration control unit 41 may restart the storage device 1 on the basis of the latest configuration information 31 by updating the configuration information 31 on the basis of the configuration change data stored in the non-volatile memory 24.

Figure 11:
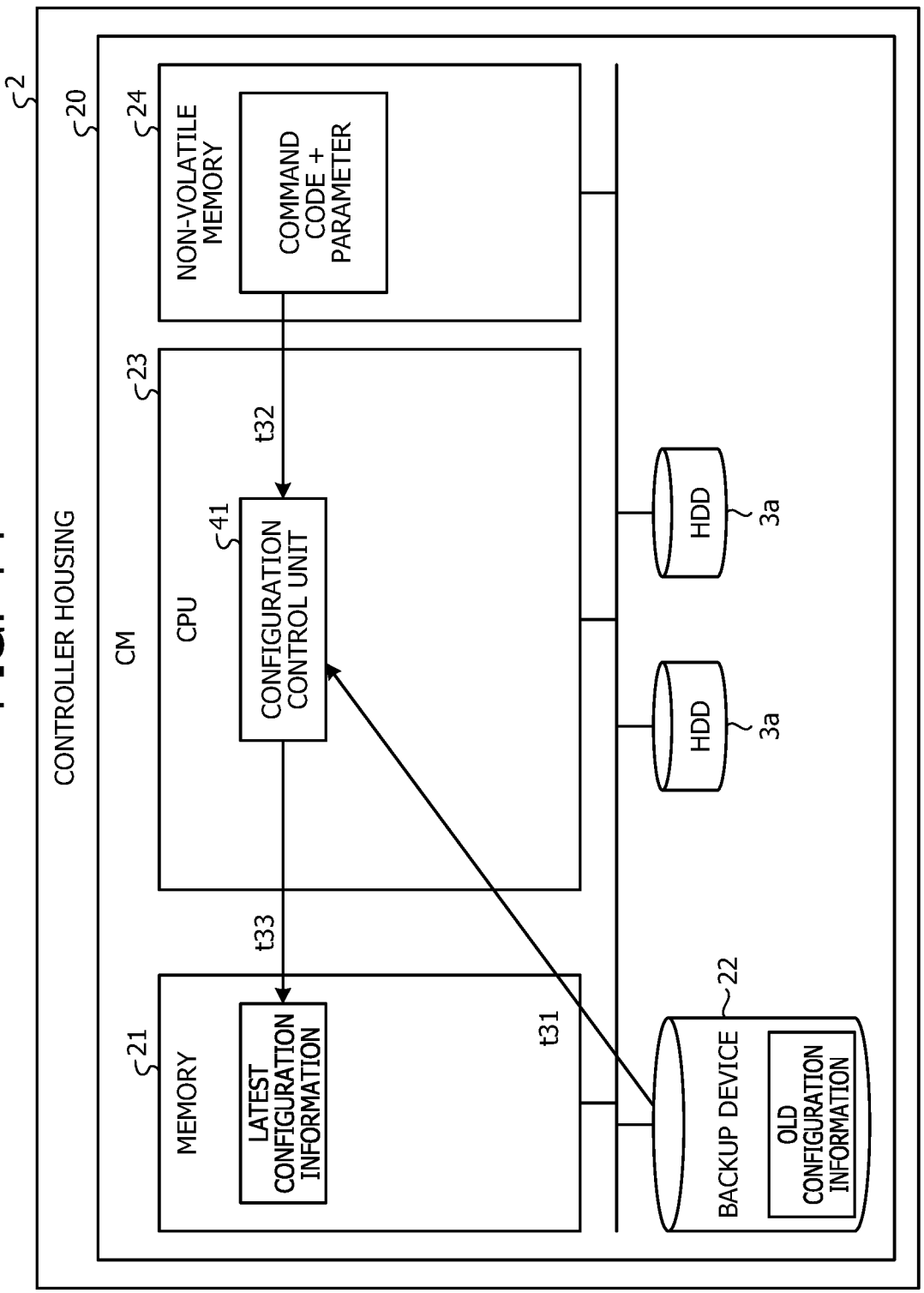
FIG. 11 is a diagram illustrating a flow of a reconfiguration process of configuration information after a device is unexpectedly turned off.

FIG. 11 is a diagram illustrating a flow of a reconfiguration process of the configuration information 31 after the device is unexpectedly turned off. As illustrated in FIG. 11, the configuration control unit 41 instructs the BUD access control unit 43 to extract the configuration information 31 from the backup device 22 (t31) and load it in the memory 21. Then, the configuration control unit 41 sequentially extracts the configuration change data from the non-volatile memory 24 (t32), and updates the configuration information 31 (t33).

Returning to FIG. 1, the inter-CM communication control unit 44 controls communication with another CM 20. The inter-CM communication control unit 44 performs communication for synchronization of the configuration information 31, for example. Alternatively, the inter-CM communication control unit 44 performs communication for specifying a state of another CM 20.

The EXP 25 is a relay device for connecting the CMs 20 and a plurality of serial attached small computer system interface (SCSI) (SAS) disk drives. The CA 26 is an interface with a host computer that uses the storage device 1. The switch 27 is a repeater that relays communication with another CM 20.

Figure 12:
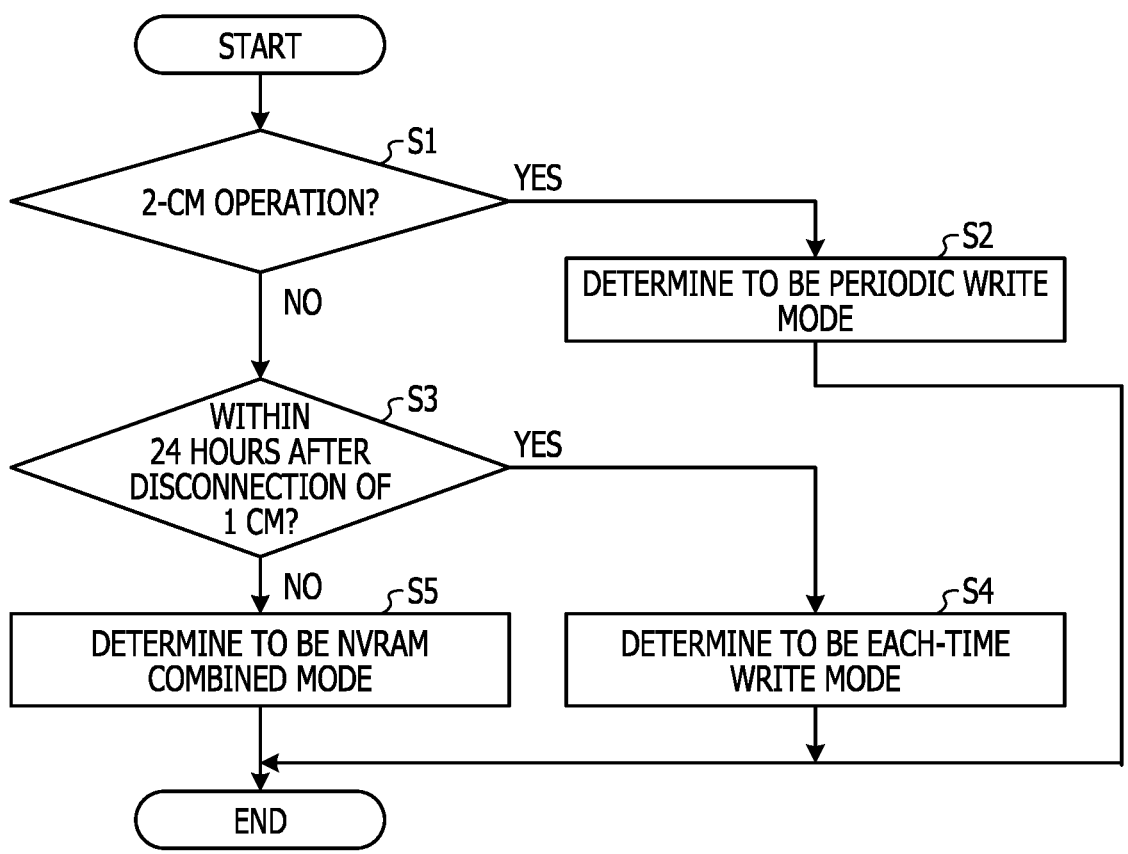
FIG. 12 is a flowchart illustrating a process flow of determining a write mode.

Next, a flow of a process performed by the configuration control unit 41 will be described with reference to FIGS. 12 to 15. FIG. 12 is a flowchart illustrating a process flow of determining a write mode. Note that the threshold time is 24 hours (24 H) in FIG. 12. As illustrated in FIG. 12, the configuration control unit 41 determines whether or not 2-CM operation is performed (step S1). Here, the 2-CM operation indicates that the storage device 1 is operated with a redundant configuration of the CM #0 and the CM #1.

Then, in the case of the 2-CM operation, the configuration control unit 41 determines that the write mode is the periodic write mode (step S2). On the other hand, in the case other than the 2-CM operation, the configuration control unit 41 determines whether or not it is within 24 hours after disconnection of 1 CM (step S3), and determines that the write mode is the each-time write mode if it is within 24 hours (step S4). On the other hand, if it is not within 24 hours after disconnection of 1 CM, the configuration control unit 41 determines that the write mode is the NVRAM combined mode (step S5).

In this manner, the configuration control unit 41 may determine the write mode by specifying the operating states of the two CMs 20.

Figure 13:
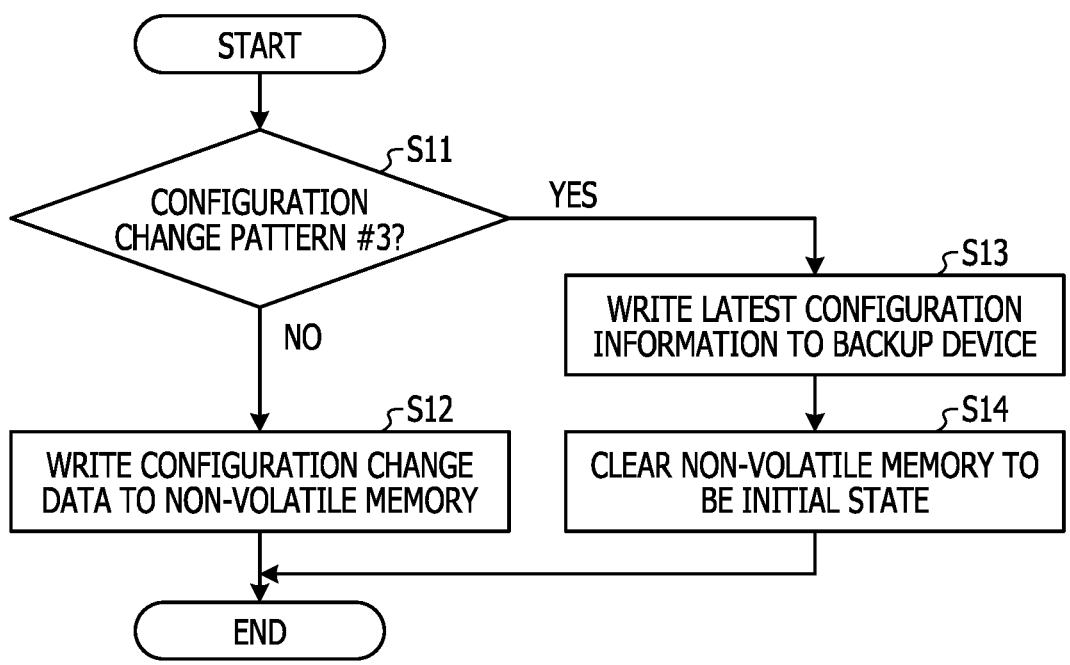
FIG. 13 is a flowchart illustrating a process flow when configuration change data is obtained in the NVRAM combined mode.

FIG. 13 is a flowchart illustrating a process flow when configuration change data is obtained in the NVRAM combined mode. As illustrated in FIG. 13, the configuration control unit 41 determines whether or not the pattern of the configuration change data is the configuration change pattern #3 (step S11), and writes the configuration change data to the non-volatile memory 24 if it is not the configuration change pattern #3 (step S12).

On the other hand, if the pattern of the configuration change data is the configuration change pattern #3, the configuration control unit 41 writes the latest configuration information 31 to the backup device 22 (step S13), and clears the non-volatile memory 24 to be the initial state (step S14).

In this manner, in the NVRAM combined mode, the configuration control unit 41 writes the latest configuration information 31 to the backup device 22 in a case where the pattern of the configuration change data is the configuration change pattern #3. Therefore, the configuration control unit 41 may reduce the need to store the configuration change data of the configuration change pattern #3 in the non-volatile memory 24.

Figure 14:
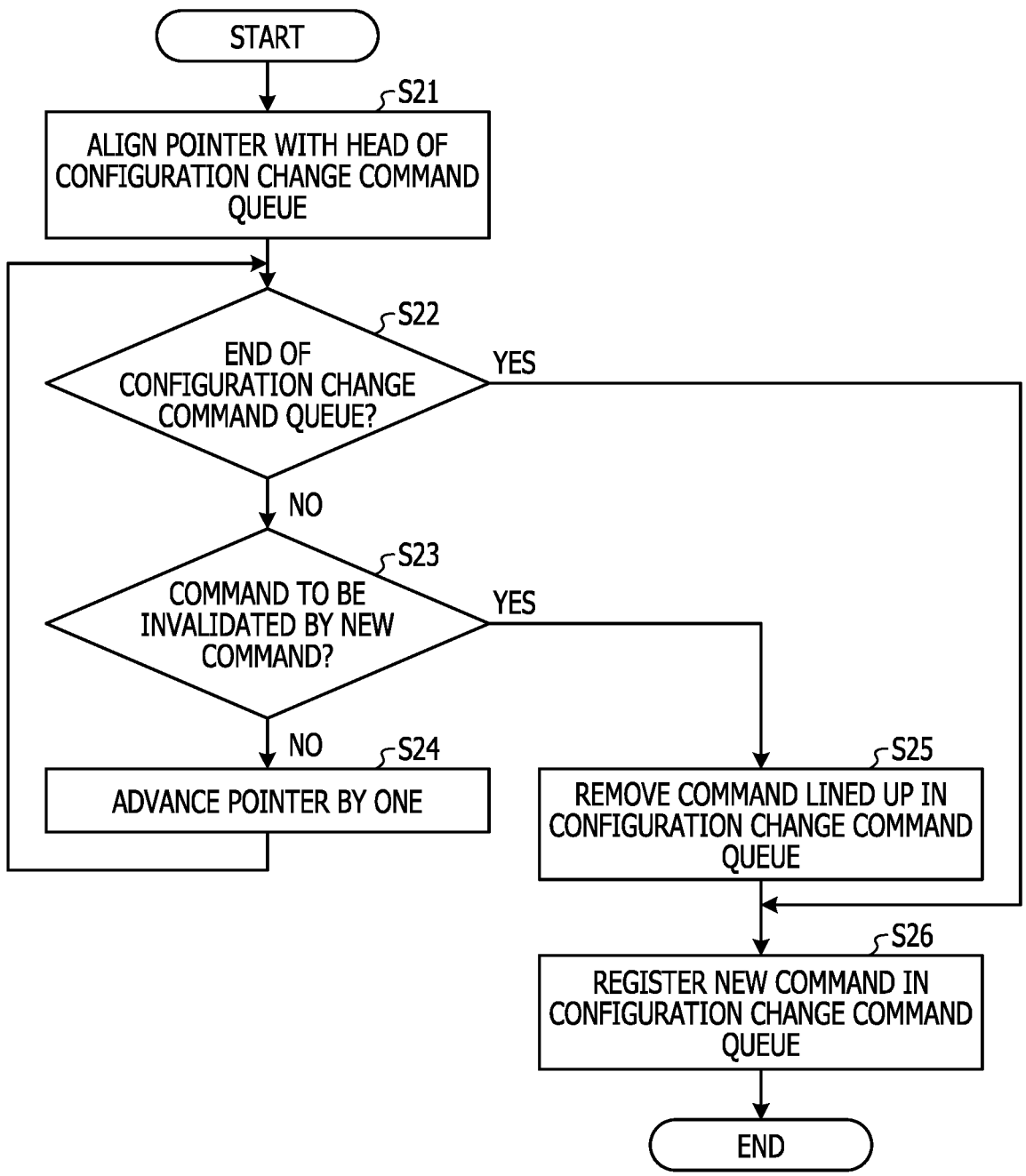
FIG. 14 is a flowchart illustrating a process flow of storing a command in the configuration change command queue.

FIG. 14 is a flowchart illustrating a process flow of storing a command in the configuration change command queue. As illustrated in FIG. 14, the configuration control unit 41 aligns a pointer with the head of the configuration change command queue (step S21). Then, the configuration control unit 41 determines whether or not the position pointed to by the pointer is the end of the configuration change command queue (step S22), and proceeds to step S26 if it is the end of the configuration change command queue.

On the other hand, if the position pointed to by the pointer is not the end of the configuration change command queue, the configuration control unit 41 determines whether or not the command at the position pointed to by the pointer is a command to be invalidated by a new command (step S23). Then, if the command at the position pointed to by the pointer is not a command to be invalidated by a new command, the configuration control unit 41 advances the pointer by one (step S24), and returns to step S22.

On the other hand, if the command at the position pointed to by the pointer is a command to be invalidated by a new command, the configuration control unit 41 removes the command lined up in the configuration change command queue (command at the position pointed to by the pointer) (step S25). Then, the configuration control unit 41 registers the new command in the configuration change command queue (step S26).

In this manner, the configuration control unit 41 may efficiently use the configuration change command queue by removing a command to be invalidated by a new command from the configuration change command queue.

Figure 15:
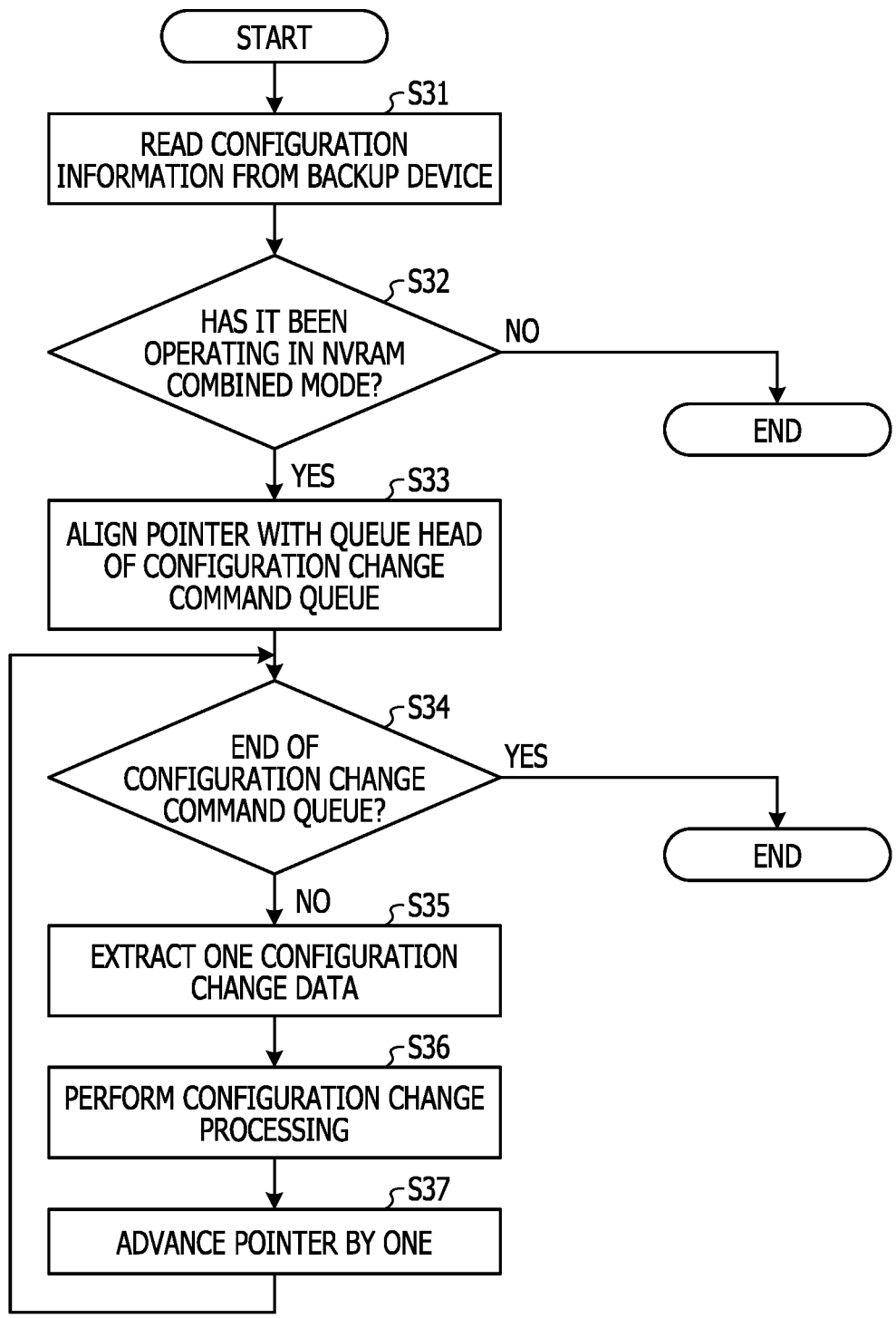
FIG. 15 is a flowchart illustrating a process flow of reconfiguring configuration information when restarting at the time of recovery from a failure.

FIG. 15 is a flowchart illustrating a process flow of reconfiguring the configuration information 31 when restarting at the time of recovery from a failure. As illustrated in FIG. 15, the configuration control unit 41 instructs the BUD access control unit 43 to read the configuration information 31 from the backup device 22 (step S31). Then, the configuration control unit 41 determines whether or not it has been operating in the NVRAM combined mode on the basis of whether or not there is a valid command in the configuration change command queue (step S32), and terminates the process if it has not been operating in the NVRAM combined mode.

On the other hand, if it has been operating in the NVRAM combined mode, the configuration control unit 41 aligns the pointer with the head of the configuration change command queue (step S33). Then, the configuration control unit 41 determines whether or not the position pointed to by the pointer is the end of the configuration change command queue (step S34), and terminates the process if it is the end of the configuration change command queue.

On the other hand, if the position pointed to by the pointer is not the end of the configuration change command queue, the configuration control unit 41 extracts one configuration change data from the configuration change command queue (step S35), and performs configuration change processing (step S36). Then, the configuration control unit 41 advances the pointer by one (step S37), and returns to step S34.

In this manner, when restarting at the time of recovery from a failure, the configuration control unit 41 extracts the configuration change data from the configuration change command queue and performs the configuration change processing, thereby allowing the storage device 1 to operate in the state of the latest configuration information 31.

Figure 16A:
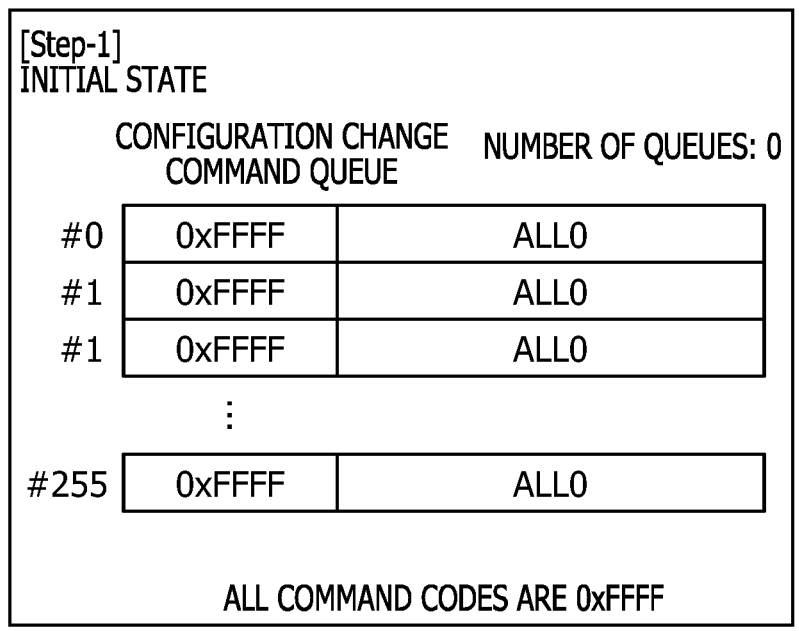
FIG. 16A is a diagram illustrating an initial state of the configuration change command queue.

Next, an example of storing commands in the configuration change command queue will be described with reference to FIGS. 16A to 16G. FIG. 16A illustrates an initial state of the configuration change command queue. As illustrated in FIG. 16A, in the initial state, all command codes in the configuration change command queue are 0xFFFF.

Figure 16B:
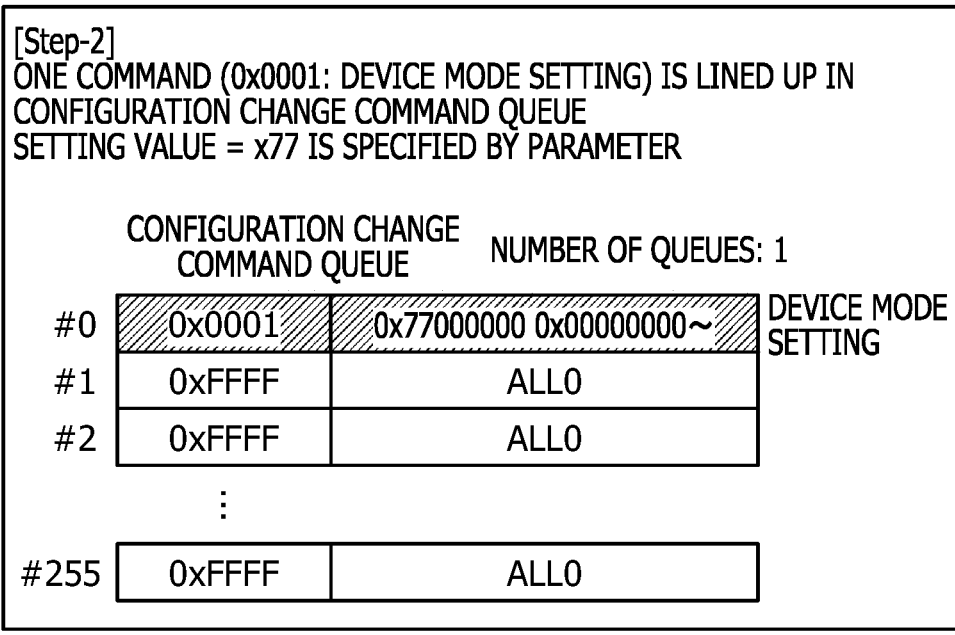
FIG. 16B is a diagram illustrating a state in which one command is stored in the configuration change command queue.

FIG. 16B illustrates a state in which one command is stored in the configuration change command queue. As illustrated in FIG. 16B, a device mode setting command with a command code of 0x0001 is stored in the configuration change command queue. The parameter 0x77 is a setting value of the device mode.

FIG. 16C illustrates a state in which one command is added to the configuration change command queue. As illustrated in FIG. 16C, a volume creation command with a command code of 0x000 is added to the configuration change command queue. The parameter 0x1234 indicates a volume number, and 0x2000 indicates a volume size (GB).

Figure 16D:
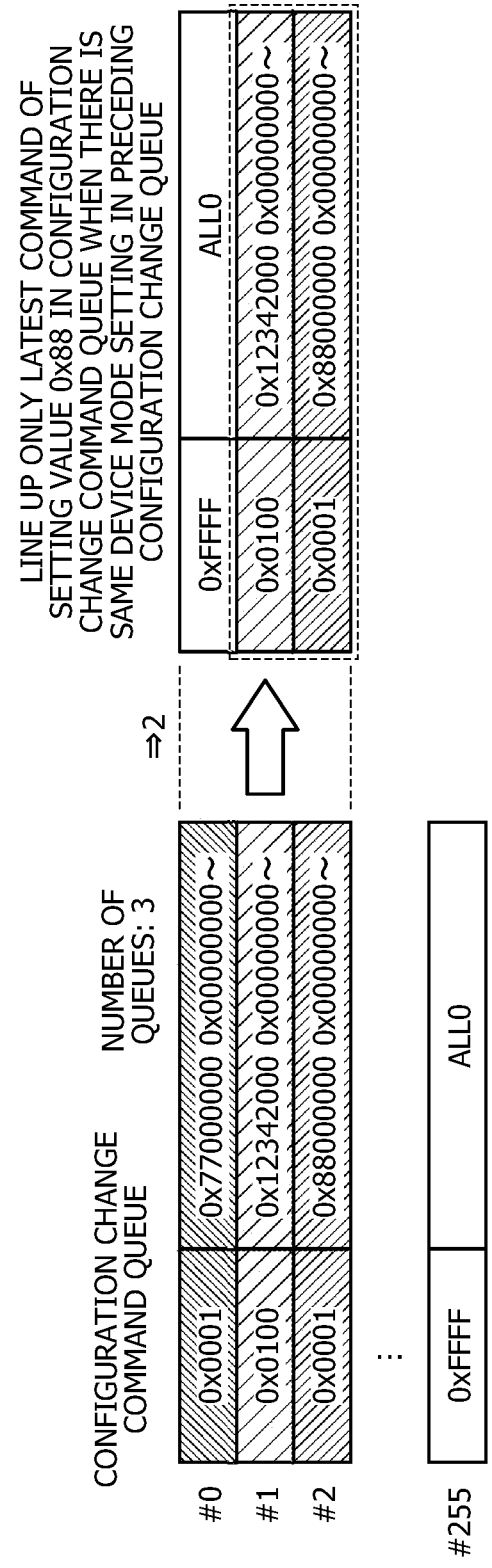
FIG. 16D is a diagram illustrating a state in which one command is further added to the configuration change command queue.

FIG. 16D illustrates a state in which one command is further added to the configuration change command queue. As illustrated in FIG. 16D, a device mode setting command with a command code of 0x0001 is added to the configuration change command queue. The setting value is 0x88. Here, since the same device mode setting commands exist in the configuration change command queue, the configuration control unit 41 removes the old device mode setting command from the configuration change command queue, and leaves only the latest device mode setting command. Therefore, the configuration control unit 41 may reduce the number of queues (the number of commands stored in the configuration change command queue).

FIG. 16E illustrates a state in which one command is further added to the configuration change command queue. As illustrated in FIG. 16E, a volume mode setting command with a command code of 0x0101 is added to the configuration change command queue. The parameter 0x01 is a volume mode setting value (encryption mode).

FIG. 16F illustrates a state in which one command is further added to the configuration change command queue. As illustrated in FIG. 16F, a volume creation command with a command code of 0x0100 is added to the configuration change command queue. The parameter 0x5678 indicates a volume number, and 0x2000 indicates a volume size (GB). The volume mode is specified as the encryption mode in the previous command, and thus an encryption volume is created.

FIG. 16G illustrates a state in which one command is further added to the configuration change command queue. As illustrated in FIG. 16G, a volume mode setting command with a command code of 0x0101 is added to the configuration change command queue. The parameter 0x00 is a volume mode setting value (non-encryption mode). While the configuration change command queue includes a volume mode setting command at the entry number #2, this volume mode setting command is not removed as it is interrelated with the volume creation command at the entry number #3.

As described above, according to the embodiment, the configuration control unit 41 determines a write mode on the basis of the redundancy state of the CM 20, and instructs the BUD access control unit 43 to back up the configuration information 31 in the backup device 22 on the basis of the determined write mode. Then, the BUD access control unit 43 writes the configuration information 31 to the backup device 22 on the basis of the instruction from the configuration control unit 41. Therefore, since the CM 20 backs up the configuration information 31 on the basis of the redundancy state, the storage device 1 is allowed to operate on the basis of the latest configuration information 31 when restarting at the time of recovery from a failure while the backup frequency of the configuration information 31 is suppressed.

Furthermore, according to the embodiment, the configuration control unit 41 determines a write mode to be the periodic write mode, and instructs the BUD access control unit 43 to back up the configuration information 31 only once a day in a case where the CM #0 and the CM #1 are in the redundant configuration state. Furthermore, the configuration control unit 41 determines the write mode to be the each-time write mode in a case where the CM #0 and the CM #1 are not in the redundant configuration state and the elapsed time from when the redundant configuration state becomes absent is equal to or less than a predetermined threshold time. Then, the configuration control unit 41 instructs the BUD access control unit 43 to back up the configuration information 31 each time it is changed. Furthermore, the configuration control unit 41 determines the write mode to be the NVRAM combined mode in a case where the CM #0 and the CM #1 are not in the redundant configuration state and the elapsed time from when the redundant configuration state becomes absent exceeds the predetermined threshold time. Then, the configuration control unit 41 stores the configuration change data in the non-volatile memory 24. Therefore, the CM 20 may allow the storage device 1 to operate on the basis of the latest configuration information 31 when restarting at the time of recovery from a failure while the backup frequency of the configuration information 31 is suppressed.

Furthermore, according to the embodiment, the configuration control unit 41 instructs the BUD access control unit 43 to back up the configuration information 31 in the backup device 22 in a case where the write mode is changed from the NVRAM combined mode to the periodic write mode or to the each-time write mode. Therefore, the configuration control unit 41 may update the backup device 22 to the latest configuration information 31.

Furthermore, according to the embodiment, the configuration control unit 41 instructs the BUD access control unit 43 to back up the configuration information 31 in the backup device 22 upon reception of the configuration change data of the configuration change pattern #3 in the NVRAM combined mode. Therefore, the configuration control unit 41 may reduce the size of the non-volatile memory 24.

Furthermore, according to the embodiment, in a case where an old command stored in the configuration change command queue is invalidated by a command to be newly added, the configuration control unit 41 abandons the old command, and adds the new command to the configuration change command queue. Therefore, the configuration control unit 41 may reduce the size of the non-volatile memory 24.

Furthermore, according to the embodiment, the configuration control unit 41 updates the configuration information 31 on the basis of the configuration change data stored in the non-volatile memory 24 if there is a valid command code in the non-volatile memory 24 at the time when the configuration information 31 is extracted from the backup device 22 and is loaded in the memory 21. Therefore, the configuration control unit 41 may update the configuration information 31 to the latest state.

Furthermore, although an exemplary case where an SSD is used for the backup device 22 has been described in the embodiment, the CM 20 may use a non-volatile storage device having data retention characteristics similar to those of the SSD for the backup device 22.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control device of controlling a first storage device, the storage control device comprising:
   memory; and
   processor circuitry coupled to the memory, the processor circuitry being configured to perform processing, the processing including:
   determining a mode indicating a process for backing up configuration information located in the first storage device based on an operating state with a second storage control device; and
   backing up the configuration information located in a memory of the first storage device to a backup device on a basis of the determined mode.

2. The storage control device according to claim 1, wherein the determining the mode includes:
   determining the mode to be a periodic write mode that periodically backs up the configuration information, when the first storage control device is in operation with the second storage control device;
   determining the mode to be an each-time write mode that performs backup each time the configuration information is changed when an elapsed time from when the operating state with the second storage control device becomes absent is equal to or less than a predetermined threshold time; and
   determining the mode to be a combined mode that writes change information to a non-volatile storage device each time the configuration information is changed, when the elapsed time from when the operating state with the second storage control device becomes absent exceeds the predetermined threshold time.

3. The storage control device according to claim 2, wherein when the mode is changed from the combined mode to the periodic write mode or to the each-time write mode, back up the configuration information stored in the memory to the backup device.

4. The storage control device according to claim 2, wherein when the mode is in the combined mode and a size of the change information exceeds a predetermined threshold size, back up the configuration information stored in the memory to the backup device.

5. The storage control device according to claim 2, wherein when then mode is the combined mode and old change information stored in the non-volatile storage device becomes invalid at a time of writing the change information to the non-volatile storage device, delete the old change information.

6. The storage control device according to claim 2, wherein when the configuration information stored in the backup device is restored to the memory and the non-volatile storage device stores change information, update the configuration information restored to the memory on a basis of the change information.

7. A storage device to be controlled by a first storage control device, the storage device comprising:
memory; and
processor circuitry coupled to the memory, the processor being configured to perform processing, the processing including:
transmitting information to cause the storage control device to determine a mode indicating a process for backing up configuration information located in the first storage device based on an operating state with a second storage control device; and
causing the storage control device to back up the configuration information located in the memory to a backup device on a basis of the mode determined by the storage control device.

8. The storage device according to claim 7, wherein the storage control device is configured to:
determine the mode to be a periodic write mode that periodically backs up the configuration information, when the first storage control device is in operation with the second storage control device,
determine the mode to be an each-time write mode that performs backup each time the configuration information is changed when an elapsed time from when the operating state with the second storage control device becomes absent is equal to or less than a predetermined threshold time, and
determine the mode to be a combined mode that writes change information to a non-volatile storage device each time the configuration information is changed, when the elapsed time from when the operating state with the second storage control device becomes absent exceeds the predetermined threshold time.

9. The storage device according to claim 8, wherein when the mode is in the combined mode and a size of the change information exceeds a predetermined threshold size, the backup device backs up the configuration information stored in the memory to the backup device.

10. The storage device according to claim 8, wherein when the mode is the combined mode and old change information stored in the non-volatile storage device becomes invalid at a time of writing the change information to the non-volatile storage device, the configuration control device deletes the old change information.

11. A non-transitory computer-readable storage medium for storing a first storage control program which causes a computer to perform processing, the computer being a computer included in a storage control device configured to control a storage device, the processing comprising:
determining a mode indicating a process for backing up configuration information located in the first storage device based on an operating state with a second storage control device; and
backing up the configuration information located in a memory of the storage device to a backup device on a basis of the determined mode.

12. The non-transitory computer-readable storage medium according to claim 11, wherein the determining process includes:
determining the mode to be a periodic write mode that periodically backs up the configuration information, when the first storage control device is in operation with the second storage control device;
determining the mode to be an each-time write mode that performs backup each time the configuration information is changed when an elapsed time from when the operating state with the second storage control device becomes absent is equal to or less than a predetermined threshold time; and
determining the mode to be a combined mode that writes change information to a non-volatile storage device each time the configuration information is changed, when the elapsed time from when the operating state with the second storage control device becomes absent exceeds the predetermined threshold time.

13. The non-transitory computer-readable storage medium according to claim 12, wherein when the mode is in the combined mode and a size of the change information exceeds a predetermined threshold size, the backing up process backs up the configuration information stored in the memory to the backup device.

14. The non-transitory computer-readable storage medium according to claim 12, the processing further comprising:
when the mode is the combined mode and old change information stored in the non-volatile storage device becomes invalid at a time of writing the change information to the non-volatile storage device, deleting the old change information.

* * * * *